(12) United States Patent
Matthews et al.

(10) Patent No.: US 12,715,302 B2
(45) Date of Patent: Aug. 25, 2026

(54) CONTROLLING THERMAL ENERGY FROM VEHICLE REGENERATIVE BRAKING

(71) Applicant: Jaguar Land Rover Limited, Whitley (GB)

(72) Inventors: James Matthews, Leamington Spa (GB); Atharva Sapte, Warwickshire (GB)

(73) Assignee: Jaguar Land Rover Limited, Whitley (GB)

( * ) Notice: Subject to any disclaimer, the term of this patent is extended or adjusted under 35 U.S.C. 154(b) by 17 days.

(21) Appl. No.: 18/852,817

(22) PCT Filed: Mar. 22, 2023

(86) PCT No.: PCT/EP2023/057386

§ 371 (c)(1),
(2) Date: Sep. 30, 2024

(87) PCT Pub. No.: WO2023/186672

PCT Pub. Date: Oct. 5, 2023

(65) Prior Publication Data

US 2025/0222779 A1 Jul. 10, 2025

(30) Foreign Application Priority Data

Mar. 29, 2022 (GB) ...................................... 2204434

(51) Int. Cl.
*B60L 7/22* (2006.01)
*B60H 1/00* (2006.01)
(Continued)

(52) U.S. Cl.
CPC ............ *B60L 7/22* (2013.01); *B60H 1/00392* (2013.01); *B60H 1/2215* (2013.01); *B60L 1/003* (2013.01);
(Continued)

(58) Field of Classification Search
CPC ... B60L 7/22; B60L 1/003; B60L 7/26; B60H 1/2215
(Continued)

(56) References Cited

U.S. PATENT DOCUMENTS 10,392,018 B1 * 8/2019 Rhodes .................. B60L 58/25
11,447,016 B2 * 9/2022 Barker ................ B60W 50/085
(Continued)

OTHER PUBLICATIONS

International Search Report and Written Opinion corresponding to application PCT/EP2023/057386, dated Jul. 5, 2023, 10 pages.
(Continued)

*Primary Examiner* — Yazan A Soofi
(74) *Attorney, Agent, or Firm* — Troutman Pepper Locke LLP; Dustin B. Weeks; Nicholas H. Doss

(57) ABSTRACT

There is provided a control system (200), a vehicle (1), a method (500), and computer software, for controlling thermal energy capture of vehicle kinetic energy of a vehicle. The control system (200) is configured to determine whether to enter a first regenerative braking energy conversion mode or a second regenerative braking energy conversion mode. The control system is configured to output a control signal (508, 510) to cause an electric machine (402, 404) of the vehicle to enter the first regenerative braking energy conversion mode or the second regenerative braking energy conversion mode in dependence on the determination. The first regenerative braking energy conversion mode is configured to provide a first proportion of total energy generated via the electric machine as thermal energy added to a cooling system (400) of the vehicle. The second regenerative braking energy conversion mode is configured to provide a second, greater, proportion of total energy generated via the electric machine as thermal energy added to the cooling system.

18 Claims, 3 Drawing Sheets

(51) Int. Cl.
*B60H 1/22* (2006.01)
*B60L 1/00* (2006.01)
*B60L 7/26* (2006.01)

(52) U.S. Cl.
CPC ........ *B60L 7/26* (2013.01); *B60H 2001/2237* (2013.01); *B60H 2001/2253* (2013.01)

(58) Field of Classification Search
USPC ........................................................... 701/22
See application file for complete search history.

(56) References Cited

U.S. PATENT DOCUMENTS

2007/0108838 A1* 5/2007 Shaffer ................... B60L 3/108 303/152
2011/0125351 A1* 5/2011 Bauerle ..................... B60L 7/22 701/22
2014/0136075 A1* 5/2014 Gonze ..................... F01P 7/167 701/102
2015/0094926 A1* 4/2015 O'Meachair ............ F16D 65/78 701/70
2018/0141462 A1* 5/2018 Kim .......................... B60L 7/14
2019/0299791 A1* 10/2019 Gonze ................... H01M 10/66
2020/0307384 A1* 10/2020 Mendez Pineda ...... B60L 50/60
2022/0072962 A1* 3/2022 Maury ...................... B60L 7/10
2022/0258716 A1* 8/2022 Follen ....................... B60L 7/10

OTHER PUBLICATIONS

GB Search Report corresponding to application GB2204434.1, dated Sep. 30, 2022, 4 pages.

* cited by examiner

CONTROLLING THERMAL ENERGY FROM VEHICLE REGENERATIVE BRAKING

TECHNICAL FIELD

The present disclosure relates to controlling thermal energy from vehicle regenerative braking. In particular, but not exclusively it relates to a control system, a vehicle, a method, and computer software for controlling thermal energy from vehicle regenerative braking.

BACKGROUND

Electric vehicles are known. Regenerative braking is known.

At the beginning of a journey of a vehicle, and in some other use cases, it is typical for its electrical energy storage means (e.g., traction battery) to be at full charge as a result of at-home charging. It is also typical in some climates for the electrical energy storage means to be outside its optimum operating temperature range. These factors, when taken alone or in combination, mean that the electrical power limit of the electrical energy storage means, for accepting electrical charge from regenerative braking, is low at the start of a journey. Little to no regenerated electrical power can flow into the electrical energy storage means until the charge is at least somewhat depleted and until the optimum operating temperature range is reached.

The result is limited regenerative braking performance, so that when the driver of the vehicle releases the throttle of the vehicle, the vehicle does not decelerate as fast as expected. Typically, the driver or a controller would then compensate by actuating the friction brakes of the vehicle. The friction brakes of the vehicle convert the kinetic energy of the vehicle into waste thermal energy that is rejected to the ambient air surrounding the friction brakes.

SUMMARY OF THE INVENTION

It is an aim of the present invention to address one or more disadvantages associated with the prior art. The present disclosure recognises that use of friction braking to compensate for a lack of regenerative braking is wasteful because the thermal energy from friction braking is rejected to the ambient air surrounding the friction brakes. Aspects of the present disclosure relate to an alternative approach which slows the vehicle while capturing thermal energy in a manner that can be used by the vehicle.

Aspects and embodiments of the invention provide a control system, a vehicle, a method, and computer software as claimed in the appended claims.

According to an aspect of the invention there is provided a control system for controlling thermal energy capture of vehicle kinetic energy of a vehicle, the control system comprising one or more controllers, the control system configured to:

- receive a signal indicative of regenerative braking energy;
- determine whether to enter a first regenerative braking energy conversion mode or a second regenerative braking energy conversion mode in dependence on the received signal; and
- output a control signal to cause an electric machine of the vehicle to enter the first regenerative braking energy conversion mode or the second regenerative braking energy conversion mode in dependence on the determination,
- wherein the first regenerative braking energy conversion mode is configured to provide a first proportion of total energy generated via the electric machine as thermal energy added to a cooling system of the vehicle, and
- wherein the second regenerative braking energy conversion mode is configured to provide a second, greater, proportion of total energy generated via the electric machine as thermal energy added to the cooling system.

An advantage is that the overall efficiency of the vehicle is improved. This is because while full regenerative braking is not available, energy can be captured in the form of thermal energy. This is achieved by running the electric machine with a lower thermal efficiency to heat the cooling system connected to the electric machine. The increased thermal energy in the cooling system can be used by other subsystems of the vehicle, for example to bring them quickly to an optimum operating temperature range at which they perform most efficiently.

In some examples, the determination is dependent on whether an electrical energy storage means of the vehicle does not or will not (is predicted to not) have a capability to accept the regenerative braking energy. For example, the second mode may only be selectable if a full regenerative braking capability is not available.

In some examples, the signal indicative of regenerative braking energy is indicative of electrical power that is being or will be generated via regenerative braking, associated with satisfying a regenerative torque request, and wherein the determination is dependent on whether the electrical power is or will be (is predicted to be) greater than a sum of the capability of the electrical energy storage means and a capability associated with an electrical bus. This is a situation in which, if not for the present invention, friction braking may be needed.

In some examples, the determination is dependent on an indication of upcoming required braking of the vehicle and whether the electrical energy storage means of the vehicle will cease to have the capability during the upcoming required braking. An advantage is enabling predictive energy optimisation.

In some examples, the second proportion is dependent on a controllable efficiency-related variable which is dependent on at least one of: electrical energy demand; or thermal energy demand. In some examples, the controllable efficiency-related variable is dependent on at least one of: electrical energy storage acceptance capability information (e.g., charging capability); a cabin temperature requirement; a battery temperature requirement; an electric machine temperature requirement. An advantage is enabling additional heating of subsystems that are below their optimum/setpoint temperature.

In some examples, the control system is configured to, in the second regenerative braking energy conversion mode:

- determine that the regenerative braking energy is excessive (e.g., lack of capability/capabilities to accept the regenerative braking energy, as described above);
- determine whether a temperature-controlled vehicle subsystem is available to store thermal energy, in dependence on a thermal target error of the vehicle subsystem; and
- in dependence on the temperature-controlled vehicle subsystem being available to store thermal energy, control the cooling system to cause an electrically-powered thermal control device to consume at least some of the excess generated electrical energy to raise the temperature of the electrically-powered thermal control device to reduce the thermal target error.

In some examples, the electrically-powered thermal control device comprises one or more of:

a cooling fan of the cooling system;

a refrigerant compressor of the cooling system;

a coolant pump of the cooling system; or a coolant heater of the cooling system.

In some examples, in dependence on the determination being that the temperature-controlled vehicle subsystem is not available to store thermal energy, the control system is configured to:

determine whether an ambient air heat loss device (e.g., radiator with electric cooling fan) is available to transfer thermal energy to ambient air; and in dependence on the ambient air heat loss device being available, control the cooling system to cause the excess generated electrical energy to be at least partially consumed to raise a temperature through the ambient air heat loss device.

In some examples, in dependence on the determination being that the ambient air heat loss device is not available, the control system is configured to apply a compensation gain to a friction braking request to increase a proportion of friction braking relative to regenerative braking. Therefore, if there is nowhere to store the net energy (thermal and/or electric) from regeneration, even in the second mode, friction braking can be used to slow the vehicle.

In some examples, the control system is configured to, in the second regenerative braking energy conversion mode:

obtain information indicative of deceleration of the vehicle; and cause handover from regenerative braking towards friction braking of the vehicle, in dependence on the deceleration of the vehicle increasing. An advantage of transitioning to friction braking for heavier deceleration is that noise, vibration and harshness is reduced, and transient peaks of thermal energy are reduced.

In some examples, changing between the first regenerative braking energy conversion mode and the second regenerative braking energy conversion mode comprises changing an electrical power conversion switching control scheme, controlling efficiency of conversion of alternating current from the electric machine to direct current.

According to an aspect of the invention there is provided a vehicle comprising the control system of any preceding claim.

According to an aspect of the invention there is provided a method of controlling thermal energy capture of vehicle kinetic energy of a vehicle, the method comprising:

receiving a signal indicative of regenerative braking energy;

determining whether to enter a first regenerative braking energy conversion mode or a second regenerative braking energy conversion mode in dependence on the received signal; and outputting a control signal to cause an electric machine of the vehicle to enter the first regenerative braking energy conversion mode or the second regenerative braking energy conversion mode in dependence on the determination, wherein the first regenerative braking energy conversion mode is configured to provide a first proportion of total energy generated via the electric machine as thermal energy added to a cooling system of the vehicle, and wherein the second regenerative braking energy conversion mode is configured to provide a second, greater, proportion of total energy generated via the electric machine as thermal energy added to the cooling system.

According to a further aspect of the invention there is provided computer software that, when executed, is arranged to perform any one or more of the methods described herein. According to a further aspect of the invention there is provided a non-transitory computer readable medium comprising computer readable instructions that, when executed by a processor, cause performance of any one or more of the methods described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
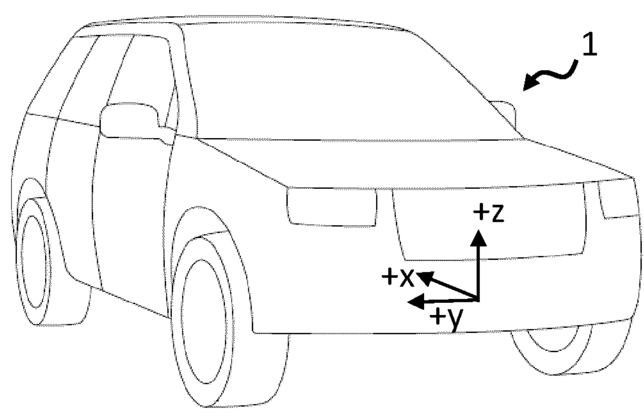
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

FIG. 1 is a front perspective view and illustrates a longitudinal x-axis between the front and rear of the vehicle 1 representing a centreline, an orthogonal lateral y-axis between left and right lateral sides of the vehicle 1, and a vertical z-axis. A forward/fore direction typically faced by a driver's seat is in the negative x-direction; rearward/aft is +x. A rightward direction as seen from the driver's seat is in the positive y-direction; leftward is −y. These are a first lateral direction and a second lateral direction.

Figure 4:
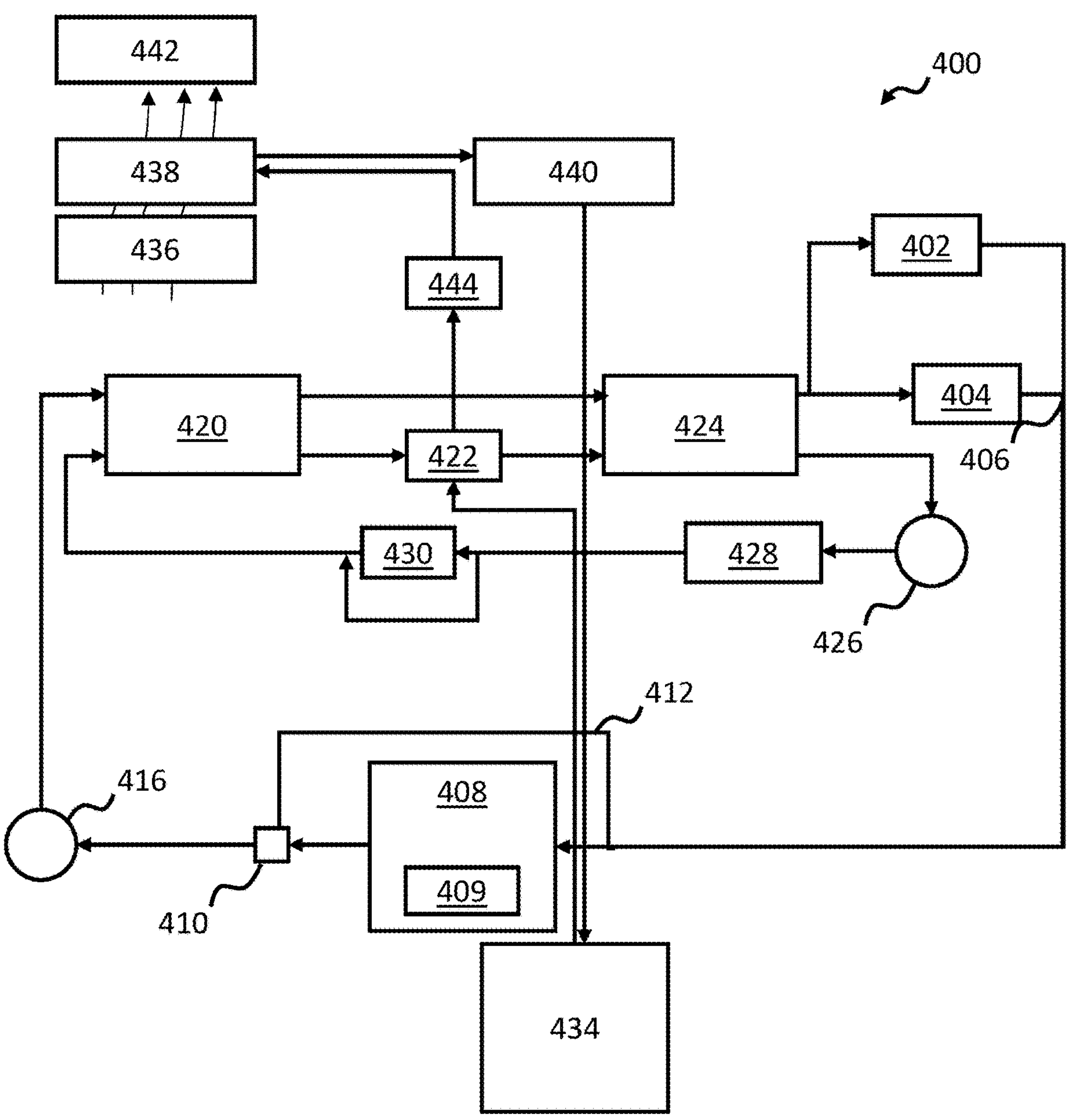
FIG. 4 illustrates an example of a cooling system.

The vehicle 1 may be an electric vehicle (EV) or a hybrid electric vehicle (HEV) such as a plug-in hybrid electric vehicle (PHEV). Referring to FIG. 4, the vehicle 1 therefore comprises electrical energy storage means 428, such as a traction battery. The vehicle 1 may be a battery EV (BEV) equipped with regenerative braking, or a fuel cell EV (FCEV) equipped with regenerative braking. The vehicle 1 further comprises one or more electric drive units (EDUs). An EDU comprises power electronics such as an inverter, a gearbox if required, and an electric machine such as a permanent magnet motor and/or an induction motor.

The electric machine can further be operated as a generator, to implement regenerative braking by to capturing vehicle kinetic energy. Regenerative braking can supplement, and in some cases replace, friction braking via a friction braking system of the vehicle 1.

Figure 2:
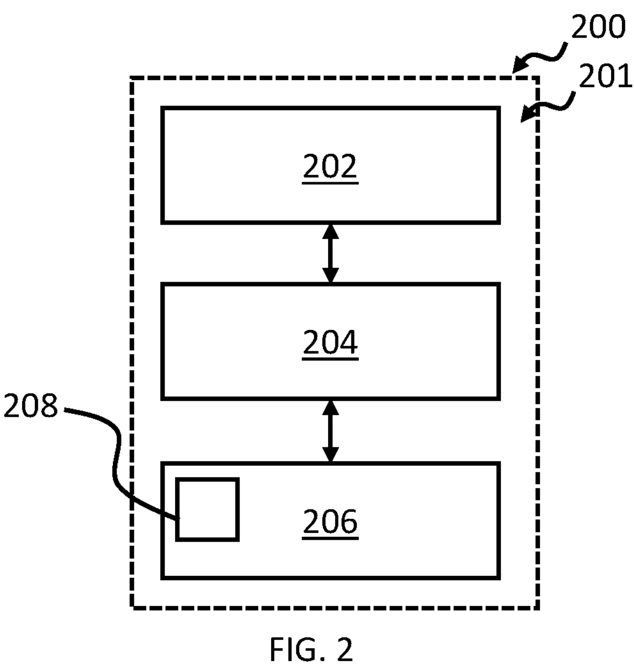
FIG. 2 illustrates an example of a control system.

FIG. 2 illustrates an example control system 200 configured to implement one or more aspects of the invention. The control system 200 of FIG. 2 comprises a controller 201. In other examples, the control system 200 may comprise a plurality of controllers on-board and/or off-board the vehicle 1.

The controller 201 of FIG. 2 includes at least one processor 204; and at least one memory device 206 electrically coupled to the electronic processor 204 and having instructions (e.g. a computer program 208) stored therein, the at least one memory device 206 and the instructions configured to, with the at least one processor 204, cause any one or more of the methods described herein to be performed. The processor 204 may have an interface 202 such as an electrical input/output I/O or electrical input for receiving information and interacting with external components.

Figure 3:
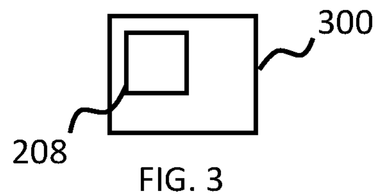
FIG. 3 illustrates an example of a non-transitory computer-readable storage medium.

FIG. 3 illustrates a non-transitory computer-readable storage medium 300 comprising the instructions (computer software).

In examples, the control system 200 of FIG. 2 may comprise a controller, such as a Powertrain Control Module, for controlling the EDU to provide functions including vehicle acceleration and regenerative braking.

The control system 200 may further comprise a controller for controlling a cooling system 400 (FIG. 4) of the vehicle 1 (example in FIG. 4) to provide functions including controlling the operating temperature of one or more temperature-controlled vehicle subsystems connected to a coolant circuit. For example, the controller may comprise a Heat Flux Management System (HFMS) Control Module.

The methods described herein may be performed by a single controller or by a plurality of controllers.

FIG. 4 illustrates an example cooling system 400. Examples of the invention can be applied to a variety of cooling systems not limited to that shown.

The cooling system 400 comprises interconnected coolant circuits, and various temperature-controlled vehicle subsystems connected to different ones of the coolant circuits.

Operation of the cooling system 400 may be managed by a heat flux management system (HFMS), also referable to as a heat pump system. The HFMS comprises a system of valves 420, 424, controlled by the control system 200, configured to control which coolant circuit is receiving which temperature of coolant. The valves 420, 424 may be controlled by the control system 200. Each coolant circuit also comprises a pump, such as an electrical pump, controlled by the control system 200.

The temperature-controlled vehicle subsystems firstly include the electric machines 402, 404. This is because an electric machine works most efficiently when its internal temperature is at an optimum operating temperature range, generally 65-85 Celsius as measured at a coolant outlet of the electric machine 402, 404.

Two electric machines 402, 404 are shown, including a first electric machine 402 for driving front wheels of the vehicle 1 and a second electric machine 404 for driving rear wheels of the vehicle 1. Other implementations may include fewer or more electric machines, connected to different wheels of the vehicle 1.

The illustrated electric machines 402, 404 are connected in parallel via parallel coolant passages, that reconnect at a junction 406. In examples, this enables the temperatures of the electric machines 402, 404 to be controlled at least partially independently.

In some examples, a temperature sensor of an electric machines 402/404 may indicate a thermal energy demand of the electric machines 402/404. The control system 200 may determine an electric machine temperature requirement, such as a setpoint, and may control the cooling system 400 to increase or decrease the temperature of the electric machines 402/404 to satisfy the electric machine temperature requirement. In some, but not necessarily all examples, the setpoint can be a value selected from the range approximately 65 Celsius to approximately 85 Celsius.

When an electric machine 402/404 is implementing regenerative braking, kinetic energy of the vehicle 1 is converted into electrical energy for charging the electrical energy storage means 428, and is also converted into 'waste' thermal energy which heats up the coolant. The proportion of total energy generated by the electric machine 402/404 as thermal energy depends on how efficiently the electric machine 402/404 is controlled to implement regenerative braking.

FIG. 4 also illustrates an ambient air heat loss device 408 fluidly connected or connectable to the electric machines 402, 404. The ambient air heat loss device 408 is also referred to as an 'LTR' (low temperature radiator). This passive device is a fluid-to-air radiator for transferring thermal energy in the coolant to ambient air. An electric cooling fan 409 may be provided to control the flow rate of air through the ambient air heat loss device 408. The required electrical load of the electric cooling fan 409 is referred to in general terms as an 'electrical energy demand' to be managed by the control system 200. The electrical energy demand of the electric cooling fan 409 may be part of a total electrical energy demand requested in relation to a plurality of temperature-controlled vehicle subsystems.

In FIG. 4, the ambient air heat loss device 408 can be bypassed via a radiator bypass path 412 and a radiator bypass valve 410. The ambient air heat loss device 408 may be bypassed during warm-up of the coolant, by controlling the radiator bypass valve 410.

FIG. 4 also illustrates a first coolant pump 416 fluidly connected or connectable to the electric machines 402, 404 and ambient air heat loss device 408. This electric coolant pump 416 can be controlled by the control system 200 to provide a required flow rate of coolant through the electric machines 402, 404 and the ambient air heat loss device 408. The load of the first coolant pump 416 is referred to in general terms as an 'electrical energy demand' to be managed by the control system 200.

FIG. 4 also illustrates electrically-controllable hydraulic valves 420, 424 controlling coolant exchange between a plurality of coolant circuits.

The illustrated first coolant circuit extends through the electric machines 402, 404, the ambient air heat loss device 408, and the first coolant pump 416. The illustrated second coolant circuit extends through a second coolant pump 426, the electrical energy storage means 428, an active coolant heater 430, and a chiller 422. In some examples, the chiller 422 can be selectably bypassed by the electrically-controllable hydraulic valves 420, 424.

It would be appreciated that the coolant circuits are not limited to the specific ones shown in FIG. 4. It would also be appreciated that although two electrically-controllable hydraulic valves 420, 424 are shown, they could be replaced by more or fewer valves.

The chiller 422 is configured to transfer thermal energy between one or more of the coolant (liquid) circuits and a refrigerant (gaseous) circuit when a thermal energy reduction is demanded. For example, the transfer may be by means of a refrigeration cycle.

The second coolant pump 426 controls coolant flow rate through the second coolant circuit. In the illustrated example, the second coolant pump 426 is fluidly connected or connectable to the chiller 422, the active coolant heater 430, and the electrical energy storage means 428.

The electrical energy storage means 428 is a further example of a temperature-controlled vehicle subsystem. For example, some battery cells operate most efficiently at an operating temperature within the range approximately 35 Celsius to approximately 45 Celsius, depending on chemistry selection.

In some examples, a temperature sensor of the electrical energy storage means 428 may indicate a thermal energy demand of the electrical energy storage means 428. The control system 200 may determine a battery temperature requirement, such as a setpoint, and may control the cooling system 400 to increase or decrease the temperature of the electrical energy storage means 428 to satisfy the battery temperature requirement.

The active coolant heater 430 is also referred to as a 'HVCH' (high voltage coolant heater). The active coolant heater 430 is an electrically-powered thermal control device such as an electrically-resistive heater, examples of which include a PTC (positive temperature coefficient) heater or equivalent. In this disclosure, 'high voltage' comprises the voltage of a high voltage DC bus, operating for example at 48 volts or more, or hundreds of volts or more. The active coolant heater 430 can be activated to increase the temperature of coolant flowing through the electrical energy storage means 428. The required electrical load of the active coolant heater 430 is referred to in general terms as an 'electrical energy demand' to be managed by the control system 200. In some examples, the active coolant heater 430 can be fluidly bypassed.

A vehicle cabin 442 is a further example of a temperature-controlled vehicle subsystem. The cooling system 400 may comprise a cabin climate coolant loop. The cabin climate coolant loop may be a separate loop fluidly connected to the chiller 422. The cabin climate coolant loop may comprise a condenser 434, an evaporator 438, a compressor 440, expansion valves, and a blower 436. The condenser 434 may be mounted in a flow path of the ambient air heat loss device 408. The required electrical load of one or more components of the cabin climate coolant loop is referred to in general terms as an 'electrical energy demand' to be managed by the control system 200. This demand may be dependent on a cabin temperature requirement (setpoint), for example.

A means for heating the cabin climate coolant loop can comprise activating the active coolant heater 430 and controlling the cooling system 400 (e.g., valves 420, 424) to direct the heated coolant through the chiller 422 to transfer thermal energy to refrigerant in the cabin climate coolant loop. In some implementations, the cabin climate coolant loop may comprise its own optional active coolant heater 444.

At the beginning of a journey of the vehicle 1, and in some other use cases, it is typical for the electrical energy storage means 428 to be at full charge as a result of at-home charging. It is also typical in some climates for the electrical energy storage means 428 to be outside its optimum operating temperature range. These factors, when taken alone or in combination, mean that the electrical power limit of the electrical energy storage means 428, for accepting electrical charge from regenerative braking, is low at the start of a journey. Little to no regenerated electrical power can flow into the electrical energy storage means 428.

The result is limited regenerative braking performance, so that when the driver of the vehicle 1 releases the throttle of the vehicle 1, the vehicle 1 does not decelerate as fast as expected. Typically, the driver or a controller would then compensate by actuating the friction brakes of the vehicle 1. The friction brakes of the vehicle 1 convert the kinetic energy of the vehicle 1 into waste thermal energy that is rejected to the ambient air surrounding the friction brakes.

In accordance with at least some examples of the invention, an opportunity has been identified to identify the operating regions of the electrical energy storage means 428 and HV ('high voltage') bus where it cannot accept all of the generated energy from regenerative braking, and change the mode of operation of vehicle's electric machine 402/404, HV bus, and cooling system 400.

The control system 200 may identify temperature-controlled subsystems which would benefit most (e.g., increased efficiency/performance) from increased thermal energy or could act as a thermal store. Depending on ambient and component temperatures these subsystems can include, but are not limited to, the electrical energy storage means 428, the electric machines 402, 404, gearbox oil, cabin temperature, or any other onboard enthalpy storage device.

The control system 200 may then optionally arbitrate the amount of electrical energy generated by regenerative braking and the potential electrical consumption of the vehicle's temperature control devices. These temperature control devices can include one or more active coolant heaters 430, 444, one or more of the coolant pumps 416, 426, an electric cooling fan 409, and/or the like. The control system 200 may operate one or more of the temperature control devices to consume additional HV electrical power without exceeding the reverse current limit through the battery. In turn, the thermal energy generated is directed to the previously identified thermal consumer.

In some examples, if a subsystem such as the electric machine 402/404 or gearbox oil, is determined as the optimal location for supplying additional energy from regenerative braking, the control system 200 may operate the electric machine 402/404 and inverter in a 'dynamic power-loss' regenerative braking energy conversion mode to cause the electric machine 402/404 to supply a greater proportion of total generated energy as thermal energy to the coolant. Although such thermal energy would typically be described as 'waste' energy to be minimised, in this use case this dynamic power-loss mode improves the overall efficiency of the vehicle 1 because the thermal energy is captured and used by the vehicle 1, as opposed to being dissipated via friction braking.

In summary, the ability to change the mode of the electric machine 402/404 to control its efficiency (thermal:electrical energy ratio) for regenerative braking means that energy is retained onboard the vehicle 1 in a useful form. The retained energy controls the thermal operating point of various temperature-controlled subsystems to improve the performance and efficiency of the vehicle 1. For example, the additional thermal and/or electrical energy can usefully speed up battery warm up, electric machine 402/404 warmup, or cabin warmup, and can reduce friction brake cooling requirements.

An additional benefit is for prolonged hill descent in a fully-charged electric vehicle 1. The ability to regeneratively brake through the electrical and cooling systems obviates the need to subtract energy from the vehicle 1 via the friction brakes. This may allow for reduced brake sizing or cooling, in turn reducing cost, weight and aerodynamic efficiency/losses.

Changing the regenerative braking energy conversion mode could be implemented by changing a lookup table, a transfer function, and/or the like. Changing between the regenerative braking energy conversion modes can comprise controlling the inverter associated with the electric machine 402/404 to change an electrical power conversion switching control scheme.

The electrical power conversion switching control scheme controls efficiency of conversion of alternating current from the electric machine 402/404 to direct current. The efficiency is dependent on the current/voltage ratio in the inverter, and the in-phaseness of a switching pattern associated with the inverter.

An operating point of an electric machine 402/404 is driven by its id-iq command. An infinite number of id-iq combinations exist to drive a single torque value. An 'efficient' control scheme (first mode) is configured to optimise the id-iq combination for the requested torque, depending on what the control scheme is trying to minimise:

- MTPA (maximum torque per ampere) control minimises the required current and therefore the DC copper loss;
- MTPV (maximum torque per volt) control minimises the voltage when driving in field weakening;
- ME (maximum efficiency) control minimises the total losses;
- Minimum rotor loss control (may lead to excessive stator losses);
- Minimum stator loss control (may lead to excessive rotor losses);
- Weighted loss minimisation control (balanced version of rotor and stator loss control schemes).

For a permanent magnet motor, the id and iq currents control the electrical current amplitude and phase advance. For an induction motor, the id and iq currents control the current amplitude and stator frequency (slip).

A function may be provided to generate losses (and therefore heat) during vehicle motion, in the second regenerative braking energy conversion mode. The function may output a controllable efficiency-related variable to control these losses. In an example implementation, the function changes the instructed rotational speed (frequency setpoint) of the electric machine 402/404 away from a calculated optimal rotational speed (frequency). For example, the function may instruct the winding switching to change its frequency to a non-optimised rpm. The modified frequency may be of the same sign as the optimised frequency. Since the rotor speed of the electric machine 402/404 is dictated by vehicle wheel speeds, electromotive force builds up in the electric machine 402/404, causing it to become less efficient at generating electrical energy. The proportion of generated thermal energy is higher relative to running the electric machine 402/404 at its optimal rotational speed.

Scaling the frequency setpoint as described above is not the only possible implementation of the function. The function could be implemented in any other way that modifies the efficiency of electrical regeneration such that more thermal energy is generated.

The minimum electric machine thermal efficiency available to the second regenerative braking energy conversion mode may be lower for induction machines (e.g., approximately 24%) than for permanent magnet machines (e.g., approximately 54%). The minimum available thermal efficiency may be greater than 0%, in other words, 'plug braking' may be prohibited. Plug braking involves reversing the machine frequency.

A function may be provided to generate losses (and therefore heat) at vehicle standstill. With the proper signal calibration, the function may be configured to allow electrical currents to be generated in only one of the dq axes. In the case of only generating d-axis currents, these currents will be transformed into heat and no torque will be generated, allowing the function to satisfy the requirements for vehicle standstill.

Figure 5:
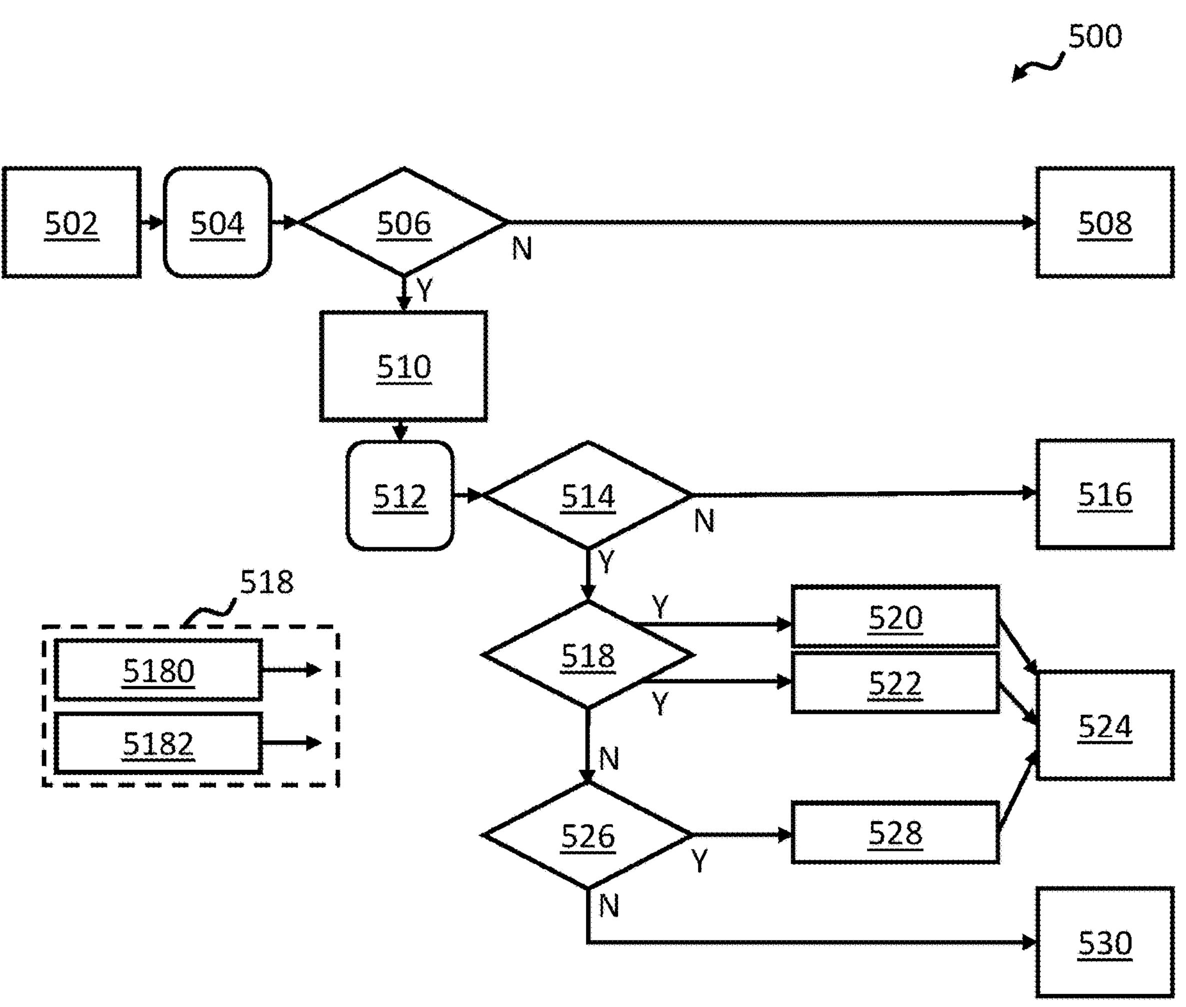
FIG. 5 illustrates an example method.

FIG. 5 illustrates an example computer-implemented method 500 for controlling thermal energy capture of vehicle kinetic energy of the vehicle 1, via the mode of regenerative braking. It would be appreciated that any step or function of the method 500 which is not recited in an independent claim and which is not identified as essential, is not essential to the invention.

FIG. 5 relates to an implementation in which the method 500 is performed reactively in response to receiving a regenerative braking torque request at block 502 of the method 500. In other implementations, at least some operations of the method 500 may be performed pre-emptively based on route data from a navigation system, before the actual regenerative braking is requested.

At data acquisition block 504 of FIG. 5, the method 500 comprises receiving a signal indicative of available regenerative braking energy. In an implementation, this comprises determining the electrical power, generated via regenerative braking, associated with satisfying the regenerative torque request. For example, block 504 may comprise determining the resultant electrical power, indicative of how much high-voltage electrical power will be supplied (or is currently being supplied) to the HV bus in dependence on controlling the electric machine 402/404 to satisfy a regenerative braking torque setpoint.

At decision block 506 of the method 500 of FIG. 5, the method 500 comprises determining, in dependence on a condition, the mode in which to control regenerative braking of the or each electric machine 402/404.

In the first regenerative braking energy conversion mode, the electric machine 402/404 is operated to provide regenerative braking at a first, relatively high efficiency. A relatively high efficiency enables a relatively high level of electrical power to be generated for a given operating condition of the electric machine 402/404. The proportion of thermal energy from the electric machine 402/404 for heating the coolant passing through the electric machine 402/404 is relatively low.

In the second regenerative braking energy conversion mode, also referred to as 'dynamic power-loss' mode, the electric machine 402/404 is operated to provide regenerative braking at a second, relatively lower thermal efficiency. A lower efficiency enables a relatively low level of electrical power to be generated for the given operating condition of the electric machine 402/404. The proportion of thermal energy from the electric machine 402/404 for heating the coolant passing through the electric machine 402/404 is relatively high, due to the inefficient conversion of kinetic energy to electrical energy.

The condition can therefore be regarded as a thermal energy capture condition for changing to the second regenerative braking energy conversion mode, because it is a condition for determining whether to lower the kinetic-electric energy conversion 'efficiency' of the electric machine 402/404 to capture a greater proportion of thermal energy, as a proportion of total energy generated via the electric machine 402/404.

According to the example of FIG. 5, but not necessarily all examples, the condition is dependent on whether the generated electrical power determined in block 504 is (or will be) greater than a sum of the charging capability of the electrical energy storage means 428 and a capability associated with the HV bus, The capability associated with the HV bus is dependent on HV bus load. The charging capability of the electrical energy storage means 428 can refer to a power limit of the electrical energy storage means 428. The HV bus load can refer to a total electrical energy demand (e.g., power demand) of the HV bus, comprising the sum of loads on the HV bus. In some examples, the condition 506 determines whether the vehicle 1 has the capability to accept all or an above-threshold amount of the electrical power generated from the required regenerative braking in the first regenerative braking energy conversion mode. If not, then the second regenerative braking energy conversion mode, despite being less thermally efficient, would enable an overall increase in vehicle efficiency by capturing additional energy as coolant heating, without causing an electrical overload.

If the condition is not satisfied, the method 500 proceeds to block 508 of the method 500. Block 508 comprises controlling or continuing to control the electric machine 402/404 in the first, relatively thermally efficient regenerative braking energy conversion mode. For example, block 508 may comprise outputting a control signal to control the electric machine 402/404 in the first regenerative braking energy conversion mode.

If the condition is satisfied, the method 500 proceeds to block 510. Block 510 comprises outputting a control signal to control the electric machine 402/404 in the second regenerative braking energy conversion mode to implement 'dynamic power-loss'. This causes the electric machine 402/404 to directly heat the coolant at a greater rate than the first regenerative braking energy conversion mode.

In some examples, the control system 200 comprises an optional arbitrator to control the mode switching and/or to control the relative proportion of thermal energy or electrical energy generated by the electric machine 402/404 in the second mode:

1—charging capability of the electrical energy storage means 428 (e.g., power limit) is insufficient, therefore, generate additional thermal energy (second mode);

2—charging capability of the electrical energy storage means 428 is sufficient, therefore, generate additional electrical energy (first mode);

3—charging capability of the electrical energy storage means 428 is sufficient, but a temperature-controlled vehicle subsystem (e.g., 402/404/428/442) is outside its optimum operating temperature range, therefore, generate additional thermal energy (second mode) to heat the coolant passing through the subsystem, and/or generate additional electrical energy (first mode) to activate/increase the power of an active coolant heater 430 to heat the coolant passing through the subsystem.

The control system 200 may therefore be configured to control the proportion of thermal energy to electrical energy (the efficiency) of the electric machine 402/404 in regeneration, in dependence on the controllable efficiency-related variable. The variable is dependent on at least one of: electrical energy demand (e.g., charging capability, active coolant heater load); or thermal energy demand (e.g., temperature error relative to a setpoint of a temperature-controlled vehicle subsystem such as 402/404/428/442).

In an alternative example, there is no arbitration of how much energy is delivered to different subsystems. For example, the control system 200 may automatically activate a predetermined thermal control device such as the active coolant heater 430, at the point negative regenerative torque is required. The control system 200 would limit the regenerative torque available to the electrical power of the active coolant heater 430, and control the cooling system 400 to direct/flow this thermal energy to the electrical energy storage means 428, to help bring it up to its optimum operating temperature for raising its efficiency and for raising its charging capability.

Blocks 512 to 530 of the method 500 are optional arbitration operations for determining the most beneficial recipient temperature-controlled vehicle subsystem, to optimise whole vehicle efficiency. They comprise determining which, if any, temperature-controlled vehicle subsystems would benefit from the potential additional thermal energy in the coolant. If there is no use for the additional thermal energy in the coolant, then the thermal energy can be rejected to ambient air and/or the control system 200 may limit regenerative braking and transition back towards friction braking.

Data acquisition block 512 of the method 500 comprises determining the generated electrical power, generated via regenerative braking in the second regenerative braking energy conversion mode, associated with satisfying the regenerative torque request.

At decision block 514 of the method 500 of FIG. 5, the method 500 comprises determining whether the generated electrical power determined in block 512 is (or will be) excessive, despite operating the electric machine 402/404 in the second regenerative braking energy conversion mode. For example, block 514 may determine whether the generated electrical power is greater than a sum of the existing charging capability of the electrical energy storage means 428 and the existing HV bus load.

If block 514 determines that the generated electrical power is less than the sum of the charging capability and the HV bus load, the method 500 proceeds to block 516 of the method 500. Block 516 comprises continuing to control the electric machine 402/404 in the second regenerative braking energy conversion mode.

If block 514 determines that the generated electrical power is greater than the sum of the charging capability and the HV bus load, the method 500 proceeds to decision block 518 of the method 500. Block 518 comprises determining whether a temperature-controlled vehicle subsystem is available to accept and store thermal energy. This may be the case if the subsystem is too cold. For example, the thermal energy demand of the temperature-controlled vehicle subsystem may be interrogated, to determine a thermal target error of the measured temperature of the subsystem relative to a thermal target/setpoint.

FIG. 5 includes optional sub-block 5180 as an example implementation of the decision block 518. Block 5180 comprises determining whether a 'climate acceptance' condition is satisfied, based on a thermal energy demand of a climate control system 200 for the vehicle cabin 442. Block 5180 may for example determine whether the thermal target error of the cabin climate coolant loop, relative to its temperature setpoint ('cabin temperature requirement'), is greater than a predetermined value such as five Celsius below the temperature setpoint. If so, the climate acceptance condition may be satisfied and the method 500 may proceed to block 520.

At block 520, the method 500 comprises activating or increasing the power of the active coolant heater 430 to warm the coolant, and controlling the cooling system 400 (e.g., electrically-controllable hydraulic valves 420, 424) to direct coolant heated by the active coolant heater 430 to transfer thermal energy to the cabin climate coolant loop, to enable a faster reduction of the thermal target error. For example, the coolant may be directed by one or more valves 420, 424 (if necessary) through a path that includes the chiller 422, to transfer its thermal energy to the cabin climate coolant loop.

The electrical energy storage means 428 may be taken out-of-circuit by the same (or different) valves 420/424, if simultaneous heating of the electrical energy storage means 428 is not required.

If the climate acceptance condition is not satisfied, activation of or increased power from the active coolant heater 430 may not be requested. Additionally, or alternatively, the coolant may not be directed as described above—for example, the coolant may bypass the chiller 422.

The next block 524 of the method 500 comprises continuing to control the electric machine 402/404 in the second regenerative braking energy conversion mode. Coolant heated by the electric machine 402/404 in the second mode may also be directed to transfer thermal energy to the cabin climate coolant loop.

In an example, the activation of the active coolant heater 430 increases the HV bus load by several kilowatts (e.g., 5 kW). This may cause the generated electrical power to no longer be excessive as defined in block 514. Optionally, if there is a margin available, the control system 200 could change the efficiency-related variable, within the second regenerative braking energy conversion mode, to enable additional electrical power generation up to the electrical power of the active coolant heater 430 (e.g., up to HV bus limit including 5 kW HVCH).

FIG. 5 includes optional sub-block 5182 as an example implementation of the decision block 518. Block 5180 comprises determining whether a ‘battery acceptance’ condition is satisfied. This determination can be based on a thermal energy demand of the electrical energy storage means 428. Block 5182 may for example determine whether the thermal target error of the electrical energy storage means 428, relative to its temperature setpoint (‘battery temperature requirement’), is greater than a predetermined value such as five Celsius below the temperature setpoint, and less than an upper limit such as 42 Celsius below the temperature setpoint. If so, the battery acceptance condition may be satisfied and the method 500 may proceed to block 522.

At block 522, the method 500 comprises activating or increasing the power of the active coolant heater 430, and controlling the cooling system 400 (e.g., valves 420, 424) to direct coolant heated by the active coolant heater 430 to the electrical energy storage means 428, to enable a faster reduction of the thermal target error. Coolant heated by the electric machine 402/404 in the second mode may also be directed through the electrical energy storage means 428.

The next block 524 is as defined above. In this case the coolant heated by the electric machine 402/404 in the second mode may be directed by one or more valves 420/424 to transfer its thermal energy to the electrical energy storage means 428.

The chiller 422 may be taken out-of-circuit by the same (or different) valves 420/424, if simultaneous heating of the cabin climate coolant loop is not required.

If the climate acceptance condition is not satisfied, activation of or increased power from the active coolant heater 430 may not be requested. Additionally, or alternatively, the coolant may not be directed as described above—for example, the coolant may bypass the electrical energy storage means 428.

In an implementation, if both the vehicle cabin 442 and the electrical energy storage means 428 can accept thermal energy, an arbitrator of the control system 200 may determine the proportion of thermal energy assigned to each of these subsystems. The output of the arbitrator may control the value of the efficiency-related variable and/or may control the valves (including 420, 424) to control the proportion of heated coolant passing through each path. The arbitrator may be a function within the control system 200.

If the decision block 518 of the method 500 determined that no temperature-controlled vehicle subsystem(s) is/are available to accept and store thermal energy, the method 500 may proceed to decision block 526. Block 526 of the method 500 comprises determining whether an ambient air heat loss device 408 is available to transfer thermal energy to ambient air.

Determining whether the ambient air heat loss device 408 is available may comprise determining whether a temperature associated with the ambient air heat loss device 408 is above a threshold. If so, then it cannot accept further thermal energy. Additionally, or alternatively, the determination may comprise determining whether the ambient air heat loss device 408 has degraded functionality. This may be achieved by determining whether a fault flag is set, and/or interrogating sensor data.

In other words, if the other subsystems are already warm enough or are too hot, the method 500 can still enable the electric machines 402, 404 to be operated in the second regenerative braking energy conversion mode, and may still enable the active coolant heater 430 to be activated, wherein the additional thermal energy associated therewith will be dissipated by connecting the ambient air heat loss device 408 via the radiator bypass valve 410. The dissipation may be increased by activating or increasing the power of the electric cooling fan of the ambient air heat loss device 408. Although in this situation thermal energy is no longer being captured by the vehicle 1, the user of the vehicle 1 would still realise the advantages of minimal friction braking, and consistent regenerative braking feel in a variety of operating conditions.

If block 526 determines that the ambient air heat loss device 408 is available, the method 500 proceeds to block 528. Block 528 of the method 500 comprises activating or increasing the power of the active coolant heater 430, and controlling the cooling system 400 (e.g., electrically-controllable hydraulic valves 420, 424) to direct coolant heated by the active coolant heater 430 to the ambient air heat loss device 408. The next block 524 of the method 500 is as defined previously.

If block 526 determines that the ambient air heat loss device 408 is not available, the method 500 proceeds to block 530. At block 530, the regenerative braking torque setpoint may be reduced to inhibit regenerative braking. This protects the cooling system 400 from excessive temperatures and protects the HV bus from excessive electrical power. In order to deliver consistent braking deceleration, the control system 200 may be configured to apply a compensation gain to a friction braking request from a brake pedal or other brake requesting-system of the vehicle 1, to amplify a proportion of friction braking relative to regenerative braking.

The above-described method 500 may be best suited to normal levels of vehicle deceleration. If vehicle deceleration is high, control may transition towards friction braking. This control logic may minimise the noise from the electric machine 402/404, which may otherwise increase during operation in the second regenerative braking energy conversion mode at higher levels of regenerative brake torque. This control logic may also reduce transients of high thermal energy. The control system 200 may be configured to, in the second regenerative braking energy conversion mode:

obtain information indicative of deceleration of the vehicle 1; and cause handover from regenerative braking towards friction braking of the vehicle 1, in dependence on the deceleration of the vehicle 1 increasing.

The above method 500 of FIG. 5 can be performed either reactively or predictively. A predictive approach would be dependent on an indication of upcoming required braking of the vehicle 1 and whether the electrical energy storage means 428 of the vehicle 1 and/or HV bus will cease to have sufficient capability to receive the generated electrical energy during the upcoming required braking (block 506). The second regenerative braking energy conversion mode could be used pre-emptively in advance of block 506 being satisfied, to ensure that sufficient charging capability is maintained throughout a vehicle journey. A predictive energy usage model may utilise downloaded navigation information associated with a programmed navigation route of the vehicle 1, to make this determination.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 5 May represent steps in a method and/or sections of code in the computer program 208. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling thermal energy capture of vehicle kinetic energy of a vehicle, the control system comprising one or more controllers, the control system configured to:

receive a signal indicative of regenerative braking energy;

determine whether to enter a first regenerative braking energy conversion mode or a second regenerative braking energy conversion mode in dependence on the received signal; and output a control signal to cause an electric machine of the vehicle to enter the first regenerative braking energy conversion mode or the second regenerative braking energy conversion mode in dependence on the determination, wherein the first regenerative braking energy conversion mode is configured to provide a first proportion of total energy generated via the electric machine as thermal energy added to a cooling system of the vehicle, and wherein the second regenerative braking energy conversion mode is configured to provide a second, greater, proportion of total energy generated via the electric machine as thermal energy added to the cooling system.

2. The control system of claim 1, wherein that the determination is dependent on whether an electrical energy storage means of the vehicle does not or will not have a capability to accept the regenerative braking energy.

3. The control system of claim 2, wherein the signal indicative of regenerative braking energy is indicative of electrical power that is being or will be generated via regenerative braking, associated with satisfying a regenerative torque request, and wherein the determination is dependent on whether the electrical power is or will be greater than a sum of the capability of the electrical energy storage means and a capability associated with an electrical bus.

4. The control system of claim 2, wherein the determination is dependent on an indication of upcoming required braking of the vehicle and whether the electrical energy storage means of the vehicle will cease to have the capability during the upcoming required braking.

5. The control system of claim 1, wherein the second proportion is dependent on a controllable efficiency-related variable which is dependent on at least one of:

electrical energy demand; or thermal energy demand.

6. The control system of claim 5, wherein the controllable efficiency-related variable is dependent on at least one of:

electrical energy storage acceptance capability information;

a cabin temperature requirement;

a battery temperature requirement; or an electric machine temperature requirement.

7. The control system of claim 1, configured to, in the second regenerative braking energy conversion mode:

determine that the regenerative braking energy is excessive;

determine whether a temperature-controlled vehicle subsystem is available to store thermal energy, in dependence on a thermal target error of the vehicle subsystem; and in dependence on the temperature-controlled vehicle subsystem being available to store thermal energy, control the cooling system to cause an electrically-powered thermal control device to consume at least some of the excess generated electrical energy to raise the temperature of the electrically-powered thermal control device to reduce the thermal target error.

8. The control system of claim 7, wherein the electrically-powered thermal control device comprises one or more of:

a cooling fan of the cooling system;

a refrigerant compressor of the cooling system;

a coolant pump of the cooling system; or a coolant heater of the cooling system.

9. The control system of claim 7, wherein in dependence on the determination being that the temperature-controlled vehicle subsystem is not available to store thermal energy, the control system is configured to:

determine whether an ambient air heat loss device is available to transfer thermal energy to ambient air; and in dependence on the ambient air heat loss device being available, control the cooling system to cause the excess generated electrical energy to be at least partially consumed to raise a temperature through the ambient air heat loss device.

10. The control system of claim 9, wherein in dependence on the determination being that the ambient air heat loss device is not available, the control system is configured to apply a compensation gain to a friction braking request to increase a proportion of friction braking relative to regenerative braking.

11. The control system of claim 1, configured to, in the second regenerative braking energy conversion mode:

obtain information indicative of deceleration of the vehicle; and cause handover from regenerative braking towards friction braking of the vehicle, in dependence on the deceleration of the vehicle increasing.

12. The control system of claim 1, wherein changing between the first regenerative braking energy conversion mode and the second regenerative braking energy conversion mode comprises changing an electrical power conversion switching control scheme, controlling efficiency of conversion of alternating current from the electric machine to direct current.

13. A vehicle comprising the control system of claim 1.

14. A method of controlling thermal energy capture of vehicle kinetic energy of a vehicle, the method comprising:

receiving a signal indicative of regenerative braking energy;

determining whether to enter a first regenerative braking energy conversion mode or a second regenerative braking energy conversion mode in dependence on the received signal; and outputting a control signal to cause an electric machine of the vehicle to enter the first regenerative braking energy conversion mode or the second regenerative braking energy conversion mode in dependence on the determination, wherein the first regenerative braking energy conversion mode is configured to provide a first proportion of total energy generated via the electric machine as thermal energy added to a cooling system of the vehicle, and wherein the second regenerative braking energy conversion mode is configured to provide a second, greater, proportion of total energy generated via the electric machine as thermal energy added to the cooling system.

15. A non-transitory, computer-readable medium having stored thereon software that, when executed, is arranged to perform the method according to claim 14.

16. The method of claim 14, further comprising, responsive to outputting the control signal to cause the electric machine of the vehicle to enter the second regenerative braking energy conversion mode:

determining that the regenerative braking energy is excessive;

determining whether a temperature-controlled vehicle subsystem is available to store thermal energy, in dependence on a thermal target error of the vehicle subsystem; and responsive to determining that the temperature-controlled vehicle subsystem is available to store thermal energy, controlling the cooling system to cause an electrically-powered thermal control device to consume at least some of the excess generated electrical energy to raise the temperature of the electrically-powered thermal control device to reduce the thermal target error.

17. The control system of claim 7, further configured to, in the second regenerative braking energy conversion mode: reduce a thermal efficiency of regenerative braking of the vehicle in dependence on the regenerative braking being excessive.

18. The method of claim 16, further comprising, responsive to determining that the regenerative braking energy is excessive, reducing a thermal efficiency of regenerative braking of the vehicle.

* * * * *